United States Patent
Shi et al.

(10) Patent No.: US 10,393,571 B2
(45) Date of Patent: Aug. 27, 2019

(54) ESTIMATION OF REVERBERANT ENERGY COMPONENT FROM ACTIVE AUDIO SOURCE

(71) Applicant: DOLBY LABORATORIES LICENSING CORPORATION, San Francisco, CA (US)

(72) Inventors: Dong Shi, Shanghai (CN); David Gunawan, Sydney (AU); Glenn N. Dickins, Como (AU); Kai Li, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/580,242

(22) PCT Filed: Jul. 6, 2016

(86) PCT No.: PCT/US2016/041187
§ 371 (c)(1),
(2) Date: Dec. 6, 2017

(87) PCT Pub. No.: WO2017/007848
PCT Pub. Date: Jan. 12, 2017

(65) Prior Publication Data
US 2018/0172502 A1    Jun. 21, 2018

Related U.S. Application Data

(60) Provisional application No. 62/197,266, filed on Jul. 27, 2015.

(30) Foreign Application Priority Data

Jul. 6, 2015  (CN) .......................... 2015 1 0391261
Sep. 17, 2015  (EP) ..................................... 15185650

(51) Int. Cl.
*H04R 29/00* (2006.01)
*G01H 7/00* (2006.01)
(Continued)

(52) U.S. Cl.
CPC ............... *G01H 7/00* (2013.01); *G10L 25/21* (2013.01); *H04R 1/406* (2013.01); *H04R 3/005* (2013.01)

(58) Field of Classification Search
CPC .......... G01H 7/00; G01H 13/00; G10L 25/03; G10L 25/06; G10L 25/12; G10L 25/18;
(Continued)

(56) References Cited

U.S. PATENT DOCUMENTS 6,002,776 A   12/1999  Bhadkamkar
6,909,041 B2   6/2005  Ohta
(Continued)

FOREIGN PATENT DOCUMENTS

WO   2014/091375   6/2014
WO   2014/130221   8/2014

OTHER PUBLICATIONS

Jacobsen, F. et al "The Coherence of Reverberant Sound Fields" The Journal of the Acoustical Society of America 108, Jul. 2000.
(Continued)

*Primary Examiner* — Leshui Zhang

(57) ABSTRACT

Example embodiments disclosed herein relate to a estimation of reverberant energy components from audio sources. A method of estimating a reverberant energy component from an active audio source (100) is disclosed. The method comprises determining a correspondence between the active audio source and a plurality of sample sources by comparing one or more spatial features of the active audio source with one or more spatial features of the plurality of sample sources, each of the sample sources being associated with an
(Continued)

adaptive filtering model (101); obtaining an adaptive filtering model for the active audio source based on the determined correspondence (102); and estimating the reverberant energy component from the active audio source over time based on the adaptive filtering model (103). Corresponding system (800) and computer program product (900) are also disclosed.

16 Claims, 4 Drawing Sheets

(51) Int. Cl.
*G10L 25/21* (2013.01)
*H04R 1/40* (2006.01)
*H04R 3/00* (2006.01)

(58) Field of Classification Search
CPC . G10L 25/21; G10L 19/00; G10L 2019/0014;
G10L 19/008; H04R 1/406; H04R 3/005;
H04R 25/407; H04R 27/00; G10H 1/16;
G10H 1/0091; G10K 15/08; G10K 15/12;
G10K 15/10; G10K 11/16; H04B 3/20;
H04B 15/00; H04S 7/30; H04S 2400/15;
G01S 3/802; H03G 3/00; A61F 11/06;
H03B 29/00
USPC ............... 381/61–66, 56, 58; 704/E21.007,
704/E19.014, E21.002; 379/3; 455/570;
700/94
See application file for complete search history.

(56) References Cited

U.S. PATENT DOCUMENTS

| | | | |
|---|---|---|---|
| 7,039,200 B2 | 5/2006 | Rui | |
| 7,394,907 B2 | 7/2008 | Tashev | |
| 7,464,029 B2 | 12/2008 | Visser | |
| 8,023,662 B2 | 9/2011 | Mitsuhashi | |
| 8,098,842 B2 | 1/2012 | Florencio | |
| 8,175,291 B2 | 5/2012 | Chan | |
| 8,233,353 B2 | 7/2012 | Zhang | |
| 8,271,277 B2 | 9/2012 | Kinoshita | |
| 2003/0206640 A1* | 11/2003 | Malvar | H03H 21/0012 381/93 |
| 2005/0069143 A1* | 3/2005 | Budnikov | G10H 1/0091 381/63 |
| 2008/0273708 A1 | 11/2008 | Sandgren | |
| 2008/0292108 A1* | 11/2008 | Buck | H04R 3/04 381/63 |
| 2009/0248403 A1* | 10/2009 | Kinoshita | H04N 7/147 704/219 |
| 2011/0002473 A1* | 1/2011 | Nakatani | 381/66 |
| 2011/0317522 A1 | 12/2011 | Florencio | |
| 2012/0099732 A1 | 4/2012 | Visser | |
| 2012/0221329 A1* | 8/2012 | Harsch | H04R 3/02 704/225 |
| 2012/0237047 A1* | 9/2012 | Neal | H04B 3/234 381/66 |
| 2013/0010975 A1* | 1/2013 | Tsingos | G10L 21/0202 381/63 |
| 2014/0241528 A1 | 8/2014 | Gunawan | |
| 2014/0241549 A1 | 8/2014 | Stachurski | |
| 2015/0066500 A1* | 3/2015 | Gomez | G10L 15/20 704/233 |
| 2015/0092965 A1* | 4/2015 | Umminger | H04S 7/304 381/310 |
| 2015/0350801 A1* | 12/2015 | Koppens | H04S 1/005 381/1 |

OTHER PUBLICATIONS

Rui, Y. et al "Time Delay Estimation in the Presence of Correlated Noise and Reverberation" IEEE International Conference on Acoustics, Speech, and Signal Processing, May 17-21, 2004, pp. 1-4.

Ribeiro, F. et al "Using Reverberation to Improve Range and Elevation Discrimination for Small Array Sound Source Localization" IEEE Transactions on Audio, Speech, and Language Processing, vol. 18, Issue 7, Sep. 2010, pp. 1781-1792.

Tashev, I. et al "Revereberation Reduction for Improved Speech Recognition" Microsoft Research Georgia Institute of Technology School of ECE, 2005, Communication and Microphone Arrays, pp. 1-2.

\* cited by examiner

ESTIMATION OF REVERBERANT ENERGY COMPONENT FROM ACTIVE AUDIO SOURCE

CROSS-REFERENCE TO RELATED APPLICATIONS

This application claims priority to Chinese Patent Application No. 2015103912615, filed Jul. 6, 2015; U.S. Provisional Application No. 62/197,266, filed Jul. 27, 2015; and European Patent Application No. 15185650.7, filed Sep. 17, 2015, all of which are incorporated by references in their entirety.

TECHNOLOGY

Example embodiments disclosed herein generally relate to reverberant energy estimation, and more specifically, to a method and system for estimating reverberant energy from an active audio source.

BACKGROUND

When sound is recorded in a room, a signal recorded by a sound capturing endpoint or sound capturing device such as a microphone typically includes two components. One component is normally referred to as direct energy and the other as reverberant energy.

The direct energy is transmitted to the sound capturing endpoint directly from one or more audio sources without being bounced or reverberated by walls. The audio source may be anything producing sound, such as a speaking person, an instrument being played by someone, a loudspeaker controlled by a playback device and the like.

The reverberant energy is also produced by the sound source. However, this reverberant component is captured after it has bounced off an object such as a wall at least one time. During the travelling of sound, the amplitude of the sound is attenuated. Also after bouncing off an object such as a wall, some frequency bands of the sound are absorbed (partially) by the surface of the wall, changing the spectrum of the reverberated sound. Considering that the spectrum and the arrival time of the reverberated sound at the sound capturing endpoint may be rather different from those of the directly transmitted sound; it is beneficial to obtain the two components for later processing, for example, for reflecting diffusivity for the sound source.

Existing methods to estimate the reverberant energy component from the audio source and generate spatial features for the audio source usually rely on prior knowledge or estimations of properties of the room such as reverberation time (RT60), which is the time required for reflections of a direct sound to decay 60 dB, or absorption coefficients of the walls. As a result, the existing methods are time consuming and not practical in reality since prior knowledge about the room acoustics is normally absent.

In view of the foregoing, there is a need in the art for a solution for estimating reverberant energy component from an active audio source for improved precision, repeatability and speed.

SUMMARY

In order to address the foregoing and other potential problems, example embodiments disclosed herein proposes a method and system for estimating reverberant energy component from an active audio source. The active audio source indicates a source producing sound.

In one aspect, example embodiments disclosed herein provide a method of estimating a reverberant energy component from an active audio source. The method includes determining a correspondence between the active audio source and a plurality of sample sources, notably by comparing one or more spatial features of the active audio source with one or more spatial features of the plurality of sample sources, wherein each of the sample sources is associated with an adaptive filtering model, obtaining an adaptive filtering model for the active audio source based on the determined correspondence and estimating the reverberant energy component from the active audio source over time based on the adaptive filtering model. In other words, a method for estimating a reverberant energy component which makes use of a plurality of different sample sources which each exhibit one or more spatial features is described. In other words, properties of each of the plurality of different sample sources are described by one or more spatial features (such as position, angle, diffusibility, spatial information, sound level, etc.). Furthermore, each of the plurality of different sample sources is associated with a (different) adaptive filtering model which enables the estimation of the reverberant energy of sound being emitted by the corresponding sample source. In order to estimate the reverberant energy of sound emitted by an active audio source, one or more spatial features for the active audio source are determined (e.g. based on the captured sound, based on visual data and/or based on infrared data). By comparing the one or more spatial features of the active audio source with the one or more spatial features of the plurality of different samples sources, a corresponding sample source is identified and the adaptive filtering model which is associated with the corresponding sample source is used for estimating the reverberant energy component of sound being emitted by the active audio source. As such, the method assumes that if an active audio source has similar one or more spatial features to one of the sample sources, then the (known) adaptive filter model of the selected sample source is a good candidate for estimating the reverberant energy component of the active audio source. By doing this, the reverberant energy component of sound emitted by an active audio source may be estimated with high speed, precision and reliability.

In another aspect, example embodiments disclosed herein provide a system for estimating a reverberant energy component from an active audio source. The system includes a determining unit configured to determine a correspondence between the active audio source and a plurality of sample sources, notably by comparing one or more spatial features of the active audio source with one or more spatial features of the plurality of sample sources, each of the sample sources being associated with an adaptive filtering model; an adaptive filtering model obtaining unit configured to obtain an adaptive filtering model for the active audio source based on the determined correspondence; and a reverberant energy component estimating unit configured to estimate the reverberant energy component from the active audio source over time based on the adaptive filtering model. The active audio source and the plurality of sample sources may e.g. correspond to different speakers located at different positions with regards to an audio capturing device (e.g. with regards to an audio conference microphone arrangement). By way of example, the active audio source may be or may correspond to one of the plurality of sample sources.

Through the following description, it would be appreciated that the reverberant energy estimation that is used to reflect in an auditory scene the diffusivity (and potentially the distance) for each sound source (speaker) can be improved in accordance with example embodiments disclosed herein. Sound sources within a room can be better modeled and grouped. These models then provide a foundation for tracking of speakers and smart applications such as meeting annotation and speech separation. By characterizing the relationship between the direct energy and the reverberant energy with an adaptive filtering model, the reverberant energy can be estimated with more accuracy. In addition, robust adaptive filter coefficients can be used to represent the reverberation path of the source and mapped as diffusivity. Furthermore, in order to handle multiple sources in real time, effective and simple strategies are developed to switch between each of adaptive filtering models for the sample sources by using other spatial features. This would significantly increase the robustness of the system and accelerate the adaption of the models, and thus improve the processing speed.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DESCRIPTION OF EXAMPLE EMBODIMENTS

Figure 1:
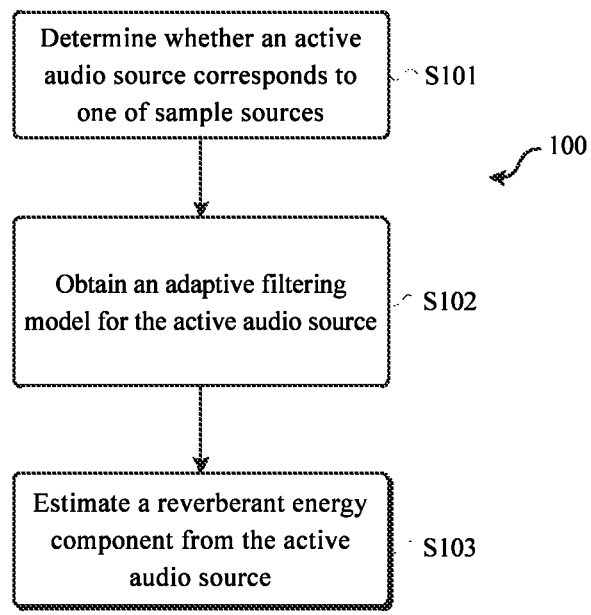
FIG. 1 illustrates a flowchart of a method of estimating reverberant energy component from an active audio source in accordance with an example embodiment.

Principles of the example embodiments disclosed herein will now be described with reference to various example embodiments illustrated in the drawings. It should be appreciated that the depiction of these embodiments is only to enable those skilled in the art to better understand and further implement the example embodiments disclosed herein, not intended for limiting the scope in any manner.

The example embodiments disclosed herein utilize at least one audio capturing endpoint such as microphone in order to obtain the direct energy component as well as the reverberant energy component. By modelling the reverberant energy component as the output of a linear filter and the direct energy component as filter input, a proper adaptive filtering model is used to approximate the corresponding filter coefficient, which is then used as an indicator of how reverberant the source is and can be further mapped to a diffusivity measure. In real applications, multiple sources are usually involved. Therefore, in order to be able to track multiple sources at different locations in an auditory scene in real time, each source is assigned with an adaptive filtering model for speeding up the estimating processes. Additionally, a mechanism is developed to quickly switch between sources by using other spatial features (for example, angle, sound level, etc.), such that once a source is active, its corresponding adaptive filtering model can be adapted in a short time.

In order to be able to track multiple sources, each source has its own adaptive model that is adapted whenever the source is active. Keeping track of the adaptive model for each source helps accelerate the reverberant energy estimation and also provides more robustness and stability.

FIG. 1 illustrates a flowchart of a method 100 of estimating a reverberant energy component from an active audio source in accordance with an embodiment. At S101, whether the active audio source corresponds to one of a number of sample sources is determined. The active audio source may be, for example a source producing sound in a room. Each of the sample sources is associated with an adaptive filtering model. However, in a case that no sample source has been provided at the very beginning, it should be determined that the active audio source corresponds to no sample source.

The determining step S101 may be achieved in different ways. For example, some of spatial features may be extracted from the active audio source captured by the audio capturing endpoint. The spatial features may include angle information which indicates the orientation of the active audio source in relation to the audio capturing endpoint, as well as amplitude information which indicates the loudness or sound level of the active audios source. Alternatively, the step S101 may also be achieved by a visual capturing endpoint such as a camera, which may obtain spatial information of a particular source by analyzing the captured image. Other means such as infrared detection may also be utilized so as to obtain the spatial features of the active audio source. Consequently, the spatial features of the active audio source may be compared with those of sample sources in order to determine whether there is a sample source used for representing the active audio source. As indicated above, the spatial features (denoted as Ψ herein) may include information regarding the position of the active audio source (such as angle information and/or distance information). As such, a spatial feature of an audio source may describe a property of the audio source in relation to an audio capturing device (e.g. a microphone) which is adapted to capture sound from the audio source. In particular, a spatial feature of an audio source may be indicative of or may correspond to at least one of: a position of the audio source relative to the audio capturing device, spatial information regarding the audio source relative to the audio capturing device, a distance of the audio source from the audio capturing device, an angle indicating an orientation of the audio source relative to the audio capturing device, a sound level at which sound coming from the audio source is captured at the audio capturing device and/or a diffusivity of sound being emitted by the audio source. A spatial feature of the active audio source may be determined based on data of the active audio source captured by one or more sensors, such as an audio capturing device, a visual capturing device and/or an infrared detection device.

At step S102, an adaptive filtering model is obtained for the active audio source based on the determined correspondence. For example, the adaptive filtering model may be obtained in two ways. The first way may rely on the determining step at the step S101: if the active audio source corresponds to none of the sample sources, which also includes the situation where no sample source is provided, a sample source corresponding to the active audio source is created. The created sample source is assigned with the spatial features of the captured active audio source, and will be later assigned with an adaptive filtering model.

Then, the adaptive filtering model associated with the created sample source may is estimated. This process may be carried out in different ways and will be explained in detail later in the descriptions.

On the other hand, the second way may also rely on the determining step S101: if the active audio source corresponds to one of the sample sources, the active filtering model associated with the corresponded sample source may be assigned to the active audio source.

At step S103, a reverberant energy component is estimated from the active audio source over time based on the obtained adaptive filtering model at the step S102. The estimation of the reverberant energy component over time is useful in updating the adaptive filtering model. As a result, diffusivity may be obtained from the adaptive filtering model by a predetermined mapping for example.

Figure 2:
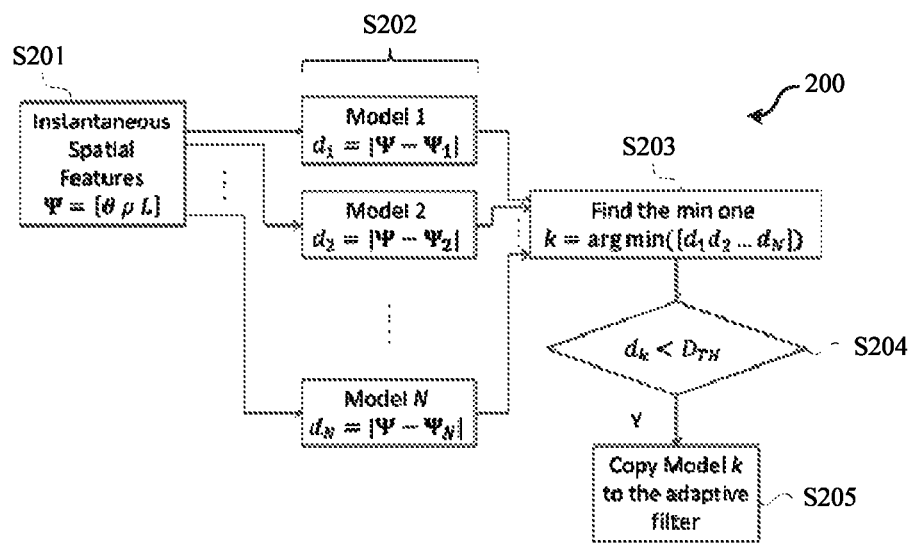
FIG. 2 illustrates an example flow of determining whether the active audio source corresponds to one of a number of sample sources in accordance with an example embodiment.

FIG. 2 illustrates an example flow 200 of determining whether the active audio source corresponds to one of a number of sample sources in accordance with an embodiment. In order to quickly select an adaptive filtering model for the active audio source (by finding a proper sample source) and continue to adapt its adaptive filtering model for estimating the reverberant energy component, the instantaneous spatial features are extracted and used to select a corresponding sample source model from a model group. This selection process may be online-based. The spatial features may for example include at least one of angle, sound level and diffusivity. Angle indicates the orientation of a particular audio source in relation to the audio capturing endpoint, sound level indicates the loudness of the audio source, and diffusivity indicates how reverberant the audio source is. Each sample source model may be online-built with its own mean spatial features.

At step S201, the instantaneous spatial features may be obtained either by the audio capturing endpoint (angle, sound level) directly or as a ratio of the largest eigenvalue to the second largest eigenvalue (diffusivity), which are computed using the covariance matrix of the input signal. As indicated in FIG. 2, the instantaneous spatial feature $\Psi=[\theta \ \rho \ L]$ can be extracted, where $\theta$, $\rho$ and L denote the angle, diffusivity and sound level of the active audio source. It should be noted that the spatial feature $\Psi$ may include other and/or additional spatial features such as the distance of the active audio source from the capturing endpoint and/or the position of the active audio source relative to the capturing endpoint. This information may be determined e.g. based on data captured by a camera and/or based on captured sound from the active audio source. In order to determine which model the active source belongs to or corresponds to, a distance $d_i$ between $\Psi$ and those of the i-th models ($\Psi_i$) is computed in step S202 as:

$$d_i=|\Psi-\Psi_i| \text{ for } i=1,2 \ldots N \quad (1)$$

where N represents the total number of sample source models.

At step S203, the sample source model k whose spatial features are closest to W is then picked up. To make the selection more robust, at step S204, the minimum distance $d_k$ shown in FIG. 2 is compared with a predefined threshold $D_{TH}$. If the minimum distance is smaller than the predefined threshold, it is determined that the active audio source corresponds to the sample source k, and thus the model for the sample source k is copied to the adaptive filtering model at step S205. Otherwise, no model will be selected. As such, the step S101 of determining a correspondence between the active audio source and a plurality of sample sources may include determining, for each of the plurality of sample sources, a distance $d_i$ between the one or more spatial features $\Psi$ of the active audio source and the one or more spatial features $\Psi_i$ of a sample source. The corresponding sample source may be determined based on the plurality of distances $d_i$. In particular, the sample source having the lowest distance $d_i$ (and the corresponding filtering model) may be selected. In other words, the step S101 of determining a correspondence between the active audio source and a plurality of sample sources may include determining the sample source from the plurality of samples sources whose one or more spatial features $\Psi_i$ are closest to the one or more spatial features $\Psi$ of the active audio source. By way of example, the one or more spatial features of an audio source may include spatial information regarding the audio source. In such a case, determining the correspondence between the active audio source and the plurality of sample sources may include: selecting one of the plurality of sample sources spatially closest to the active audio source, and determining that the active audio source corresponds to the selected sample source, notably in response to a distance between the selected sample source and the active audio source being within a predefined threshold.

The adaptive filtering estimation at the step S103 will be discussed in the following. The sound is captured from the active audio source by at least one audio capturing device. In one embodiment, there may be provided with three cardioid microphones arranged in equilateral triangle topology. In another embodiment, there may be provided with three omnidirectional microphones arranged in equilateral triangle topology. It should be noted that there can be provided with less microphones such as two microphones or more microphones such as at least four or more microphones arranged in any suitable form once the spatial features can be obtained from such an arrangement. Alternatively, in another embodiment, there can be provided with only one microphone in order to capture a sound signal without spatial feature. In general, the adaptive filtering model estimation processes for multiple microphones and for single microphone are different and will be discussed separately in the following.

Extraction Process for Multiple Microphones

Figure 3:
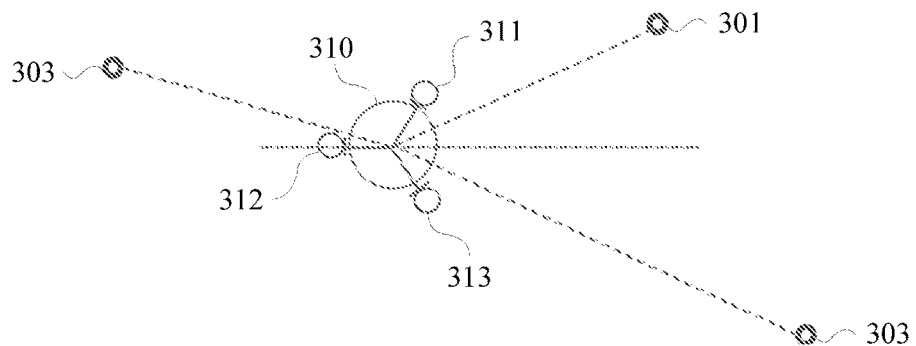
FIG. 3 illustrates an example of an auditory scene with multiple sources at different locations and an audio capturing endpoint with three microphones in accordance with an example embodiment.

In one embodiment, as described above, the audio capturing endpoint may include three cardioid microphones arranged in equilateral triangle topology. As shown in FIG. 3, the angle difference between each microphone pair may be 120°. In other words, the angle differences between microphones 311, 312, between microphones 312, 313, between microphones 313, 311, of the audio capturing endpoint 310 are all 120°. In such an arrangement, the microphones 311, 312, 313 are separated physically from each other with a distance. A smaller distance is advantageous because the capturing of the sound by the three microphones is affected by the distance in terms of accuracy.

Figure 4:
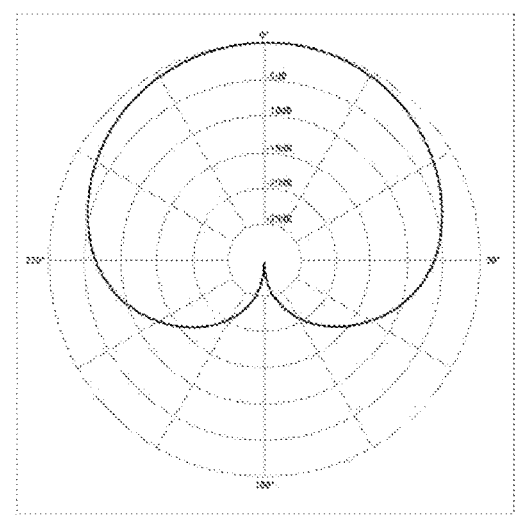
FIG. 4 illustrates a cardioid directionality of an example cardioid microphone used in the audio capturing endpoint of FIG. 3.

The cardioid directional microphone has directional amplitude response as shown in FIG. 4. A typical cardioid microphone receives the sound without attenuation at 0° (e.g., the forward direction), while the microphone receives the sound attenuated as the angle varies. The cardioid microphone receives the sound with smallest sound level at an angle opposite to 0° (i.e., 180°).

The sound captured from each of the three microphones is represented as L, R and S, respectively in accordance with their orientations. The three cardioid microphones are assumed to be identical except for their orientations.

Time domain version of the L, R and S signals can be denoted as L(n), R(n) and S(n), respectively. Therefore, their corresponding frequency domain counterparts can be transformed as L(Ω, k), R(Ω, k) and S(Ω, k), respectively, where ω represents a normalized angular frequency in radius and k represents the frame index. A frame length l is chosen as the one that corresponds to 20 ms, depending on the sampling rate. In one embodiment, l is chosen as 960 as for a sampling rate of 48 kHz, meaning that the 20 ms is sampled 960 times with an interval of 1/48000 second. In the following discussion, the frame index k is omitted in most cases for expository convenience.

The microphone array includes three cardioid microphones and has its amplitude response H(θ) as:

$$H(\theta) = \begin{bmatrix} H_L(\theta) \\ H_R(\theta) \\ H_S(\theta) \end{bmatrix} = \begin{bmatrix} 0.5 + 0.5\cos(\theta - \pi/3) \\ 0.5 + 0.5\cos(\theta + \pi/3) \\ 0.5 + 0.5\cos(\theta - \pi) \end{bmatrix} \quad (2)$$

where θ represents the angle of the active source relative to the audio capturing endpoint which has a predefined forward direction as 0°. $H_L(\theta)$ represents the amplitude response for the channel L of the cardioid microphone array, $H_R(\theta)$ represents the amplitude response for the channel R of the cardioid microphone array, and $H_S(\theta)$ represents the amplitude response for the channel S of the cardioid microphone array.

It may be assumed that the microphones are spaced with a small enough distance so that the phase difference in each microphone signal is negligible. Therefore, according to Equation (2), the input signal for a single source staying at angle θ can be described as:

$$X(\omega) = \begin{bmatrix} L(\omega) \\ R(\omega) \\ S(\omega) \end{bmatrix} = D(\omega)H(\theta) + r(\omega) \quad (3)$$

where X(ω) represents the input signal in a frequency domain, and D(ω) represents the direct signal of the audio source in the frequency domain. $r(\omega) = [r_L(\omega) r_R(\omega) r_S(\omega)]^T$ is the term standing for reverberation.

In one embodiment, it may be assumed that the reverberant components in different microphones are uncorrelated and of zero mean, for example:

$$E[r(\omega)r^H(\omega)] = \begin{bmatrix} \sigma_{r_L}^2(\omega) & 0 & 0 \\ 0 & \sigma_{r_R}^2(\omega) & 0 \\ 0 & 0 & \sigma_{r_S}^2(\omega) \end{bmatrix} = E[C_r(\omega)] \quad (4)$$

where $C_r$ represents the covariance reverberation matrix of the signal energy and E represents its expectation. $\sigma_{r_L}^2(\omega)$, $\sigma_{r_R}^2(\omega)$ and $\sigma_{r_S}^2(\omega)$ represent the reverberant energy in each microphone.

In order to extract the direct and reverberant energy, the covariance matrix of the input signal may be first computed as:

$$C(\omega,k) = \alpha C(\omega,k-1) + (1-\alpha)X(\omega,k)X^H(\omega,k) \quad (5)$$

where C(ω, k) represents the covariance matrix for frequency ω and frame index k. α represents a smoothing factor.

In one embodiment, α may be set to a value ranged from 0.9 to 0.95, for example, 0.9. Because the audio signal includes both the direct energy component and the reverberant energy component, and thus the expectation of the signal energy may be expressed as:

$$E[C(\omega)] = E[C_d(\omega)] + E[C_r(\omega)] = \sigma_d^2(\omega)H(\theta)H^H(\theta) + E[C_r(\omega)] \quad (6)$$

where $\sigma_d^2(\omega)$ represents the expected power of direct source energy, and $C_d(\omega)$ represents the covariance of the direct source energy.

Based on Equation (6), it can be shown that the sum A(ω) of the diagonal entries of C(ω) can be expressed as:

$$A(\omega) = E[C_{11}(\omega)] + E[C_{22}(\omega)] + E[C_{33}(\omega)] = \quad (7)$$
$$\sigma_d^2(\omega)\left[\left\{0.5 + 0.5\cos\left(\theta - \frac{\pi}{3}\right)\right\}^2 + \left\{0.5 + 0.5\cos\left(\theta + \frac{\pi}{3}\right)\right\}^2 + \right.$$
$$\left.\{0.5 + 0.5\cos(\theta - \pi)\}^2\right] + \sigma_{r_L}^2(\omega) + \sigma_{r_R}^2(\omega) + \sigma_{r_S}^2(\omega) =$$
$$G_1(\sigma_d^2(\omega)) + \sigma_{r_L}^2(\omega) + \sigma_{r_R}^2(\omega) + \sigma_{r_S}^2(\omega) = G_1(\sigma_d^2(\omega)) + 3\sigma_r^2(\omega)$$

where $G_1$ represents a constant, and $\sigma_r^2(\omega)$ represents the average reverberant energy in each microphone. $E[C_{11}(\omega)]$ represents the expected covariance for the first column (channel L) and the first row (channel L) of the expected covariance matrix presented in Equation (4). Similarly, $E[C_{22}(\omega)]$ represents the expected covariance for the second column (channel R) and the second row (channel R) of the expected covariance matrix, and $E[C_{33}(\omega)]$ represents the expected covariance for the third column (channel S) and the third row (channel S) of the expected covariance matrix.

In the particular arrangement of the cardioid microphones shown in FIG. 3 which directly results in Equation (2), the constant $G_1$ is calculated to be equal to 1.125. Similarly, it can also be shown that the sum B(ω) of the upper off-diagonal entries of C(ω) can be expressed as:

$$B(\omega) = E[C_{12}(\omega)] + E[C_{13}(\omega)] + E[C_{23}(\omega)] = \quad (8)$$
$$\sigma_d^2(\omega)\left[\left(0.5 + 0.5\cos\left(\theta - \frac{\pi}{3}\right)\right)\left(0.5 + 0.5\cos\left(\theta + \frac{\pi}{3}\right)\right) + \right.$$
$$\left(0.5 + 0.5\cos\left(\theta - \frac{\pi}{3}\right)\right)(0.5 + 0.5\cos(\theta - \pi)) +$$
$$\left.\left(0.5 + 0.5\cos\left(\theta + \frac{\pi}{3}\right)\right)(0.5 + 0.5\cos(\theta - \pi))\right] = G_2\sigma_d^2(\omega)$$

where $G_2$ represents a constant (e.g., 0.625). $E[C_{12}(\omega)]$ represents the expected covariance for the first column (channel L) and the second row (channel R) of the expected covariance matrix presented in Equation (4). Similarly, $E[C_{13}(\omega)]$ represents the expected covariance for the first column (channel L) and the third row (channel S) of the expected covariance matrix, and $E[C_{23}(\omega)]$ represents the expected covariance for the second column (channel R) and the third row (channel S) of the expected covariance matrix. The calculation of $G_1$ and $G_2$ will be explained later in the descriptions.

Because it is assumed that the microphones are uncorrelated with off-diagonal entries of $C_r(\omega)$ being equal to 0, in this case, $B(\omega)$ does not include reverberation entries like $A(\omega)$ does. In the particular arrangement of the cardioid microphones shown in FIG. 3 which directly results in Equation (2), the constant $G_2$ is calculated to be equal to 0.625. By combining Equations (7) and (8), the direct energy component $o_d^2(\omega)$ and the reverberant energy component $o_r^2(\omega)$ can be expressed as:

$$\begin{bmatrix} G_1 & 3 \\ G_2 & 0 \end{bmatrix} \cdot \begin{bmatrix} \sigma_d^2(\omega) \\ \sigma_r^2(\omega) \end{bmatrix} = \begin{bmatrix} A(\omega) \\ B(\omega) \end{bmatrix} \quad (9)$$

It can be seen from Equation (9) that the direct energy component $o_d^2(\omega)$ and the reverberant energy component $o_r^2(\omega)$ can be written as:

$$\begin{bmatrix} \sigma_d^2(\omega) \\ \sigma_r^2(\omega) \end{bmatrix} = \begin{bmatrix} G_1 & 3 \\ G_2 & 0 \end{bmatrix}^{-1} \cdot \begin{bmatrix} A(\omega) \\ B(\omega) \end{bmatrix} \quad (10)$$

As derived from Equations (2) to (10), the direct energy component $o_d^2(\omega)$ and the reverberant energy component $o_r^2(\omega)$ can be extracted based on the arrangement of the microphones (which determines the values of $G_1$ and $G_2$) and a linear relation of the audio signal between one ($C_{11}$, $C_{22}$ and $C_{33}$) or two ($C_{12}$, $C_{13}$ and $C_{23}$) of the microphones. In this embodiment, the linear relation may be reflected by the covariance matrix of the audio signal which may be calculated by Equation (6).

In the embodiment described above, it is assumed that the reverberant components in different microphones are uncorrelated and of zeros mean. However, the coherence of reverberant sound field may be frequency dependent and non-zero in most cases. Based on the coherence of different sound fields, the complex sound field coherence may be generated as below:

$$\Gamma_{12}(\omega) = \frac{C_{12}(\omega)}{\sqrt{C_{11}(\omega) \cdot C_{22}(\omega)}} \quad (11)$$

$$\Gamma_{13}(\omega) = \frac{C_{13}(\omega)}{\sqrt{C_{11}(\omega) \cdot C_{33}(\omega)}} \quad (12)$$

$$\Gamma_{23}(\omega) = \frac{C_{23}(\omega)}{\sqrt{C_{22}(\omega) \cdot C_{33}(\omega)}} \quad (13)$$

where $\Gamma_{12}(\omega)$ represents the sound field coherence for the channels L and R, $\Gamma_{13}(\omega)$ represents the sound field coherence for the channels L and S, and $F_{23}(\omega)$ represents the sound field coherence for the channels R and S.

As for the same sound field, $\Gamma_{12}(\omega) = \Gamma_{13}(\omega) = \Gamma_{23}(\omega)$, and thus they are denoted as $\Gamma(\omega)$ in the following. Based on Equation (6), the covariance matrix can be expressed as below:

$$E[C_{11}(\omega)] = \Phi_{dd}(\omega) H_L(\theta) H_L^H(\theta) + \Phi_{r_L r_L}(\omega) \quad (14)$$

$$E[C_{22}(\omega)] = \Phi_{dd}(\omega) H_R(\theta) H_R^H(\theta) + \Phi_{r_R r_R}(\omega) \quad (15)$$

$$E[C_{33}(\omega)] = \Phi_{dd}(\omega) H_S(\theta) H_S^H(\theta) + \Phi_{r_S r_S}(\omega) \quad (16)$$

$$E[C_{12}(\omega)] = \quad (17)$$
$$\Phi_{dd}(\omega) H_L(\theta) H_R^H(\theta) + \Phi_{r_L r_R}(\omega) = \Phi_{dd}(\omega) H_L(\theta) H_R^H(\theta) + \Gamma(\omega) \Phi_{rr}(\omega)$$

$$E[C_{13}(\omega)] = \quad (18)$$
$$\Phi_{dd}(\omega) H_L(\theta) H_S^H(\theta) + \Phi_{r_L r_S}(\omega) = \Phi_{dd}(\omega) H_L(\theta) H_S^H(\theta) + \Gamma(\omega) \Phi_{rr}(\omega)$$

$$E[C_{23}(\omega)] = \quad (19)$$
$$\Phi_{dd}(\omega) H_R(\theta) H_S^H(\theta) + \Phi_{r_R r_S}(\omega) = \Phi_{dd}(\omega) H_R(\theta) H_S^H(\theta) + \Gamma(\omega) \Phi_{rr}(\omega)$$

where $\Phi_{dd}(\omega)$ represents the direct energy component, and $\Phi_{r_L r_L}(\omega)$, $\Phi_{r_R r_R}(\omega)$, $\Phi_{r_S r_S}(\omega)$, $\Phi_{r_L r_R}(\omega)$, $\Phi_{r_L r_S}(\omega)$ and $\Phi_{r_R r_S}(\omega)$ each represent a covariance matrix entry for the reverberant energy component. $\Phi_{rr}(\omega)$ represents the average reverberant energy component in each of the microphones. Equations (14) to (16) describe the calculation of an auto power spectral density for the diagonal entries of the reverberation matrix, while Equations (17) to (19) describe the calculation of a cross power spectral density for the non-diagonal entries of the reverberation matrix.

The simplified results of Equations (17), (18) and (19) are derived based on Equations (11), (12) and (13) respectively. Based on Equations (14) through (19), the sum $A(\omega)$ of the diagonal entries of $C(\omega)$ and the sum $B(\omega)$ of the upper off-diagonal entries of $C(\omega)$ can be expressed as:

$$A(\omega) = E[C_{11}(\omega)] + E[C_{22}(\omega)] + E[C_{33}(\omega)] = G_1 \Phi_{dd}(\omega) + 3\Phi_{rr}(\omega) \quad (20)$$

$$B(\omega) = \quad (21)$$
$$E[C_{12}(\omega)] + E[C_{13}(\omega)] + E[C_{23}(\omega)] = G_2 \Phi_{dd}(\omega) + 3\Gamma(\omega) \Phi_{rr}(\omega)$$

Similar to Equations (7) and (8), $G_1$ and $G_2$ represent two constants, given that the microphone array is fixed during the audio capturing process, which can be determined by the following equations:

$$G_1 = H_L(\theta) H_L^H(\theta) + H_R(\theta) H_R^H(\theta) + H_S(\theta) H_S^H(\theta) \quad (22)$$

$$G_2 = H_L(\theta) H_R^H(\theta) + H_L(\theta) H_S^H(\theta) + H_R(\theta) H_S^H(\theta) \quad (23)$$

Therefore, based on Equation (2), $G_1$ and $G_2$ can be calculated for the example microphone arrangement as 1.125 and 0.625, respectively. By combining Equations (20) and (21), the direct energy component $\Phi_{dd}(\omega)$ and the reverberant energy component $\Phi_{rr}(\omega)$ can be expressed as:

$$\begin{bmatrix} G_1 & 3 \\ G_2 & 3\Gamma(\omega) \end{bmatrix} \cdot \begin{bmatrix} \Phi_{dd}(\omega) \\ \Phi_{rr}(\omega) \end{bmatrix} = \begin{bmatrix} A(\omega) \\ B(\omega) \end{bmatrix} \quad (24)$$

It can be seen from Equation (24) that the direct energy component $\Phi_{dd}(\omega)$ and the reverberant energy component $\Phi_{rr}(\omega)$ can be written as:

$$\begin{bmatrix} \Phi_{dd}(\omega) \\ \Phi_{rr}(\omega) \end{bmatrix} = \begin{bmatrix} G_1 & 3 \\ G_2 & 3\Gamma(\omega) \end{bmatrix}^{-1} \cdot \begin{bmatrix} A(\omega) \\ B(\omega) \end{bmatrix} \quad (25)$$

In this embodiment, the value of $\Gamma(\omega)$ is ranged from 0 to 1. The value of 0 may stand for a non-coherent sound field, in other words, a heavily reverberated room. When $\Gamma(\omega)$ is equal to 0, the estimation of the reverberant energy component can correspond to the calculation based on Equations (2) through (10).

The value of 1 may stand for a coherent sound field, in other words, a space where the reverberation characteristics do not change with respect to the frequencies. The coherent sound field may be the ideal sound field which can only be available in anechoic chamber. In reality, when the reverberation time of the room is very low or the distance between the source and the microphone is small (e.g. close-talking scenario). In such a case, the direct sound can be dominant.

In one embodiment, $\Gamma(\omega)=\text{sinc}(2\pi f_s d_{mic}/c)$, with the value of $\Gamma(\omega)$ determined by the sinc function for the situations between 0 and 1, where $f_s$ represents the frequency, c represents the speed of sound, and $d_{mic}$ represents the distance between the two adjacent microphones.

In one example embodiment disclosed herein, the audio capturing endpoint may include three omnidirectional microphones instead of three cardioid microphones. The arrangement of the three omnidirectional microphones can be identical with that of the three cardioid microphones as described previously, as illustrated by FIG. 3.

Different from Equation (2), The microphone array including three omnidirectional microphones has its amplitude response $H(\theta)$ as:

$$H(\theta) = \begin{bmatrix} H_L(\theta) \\ H_R(\theta) \\ H_S(\theta) \end{bmatrix} = \begin{bmatrix} 1 \\ 1 \\ 1 \end{bmatrix} \quad (26)$$

From the above equation, the values of $G_1$ and $G_2$ are both 3.

Figure 5:
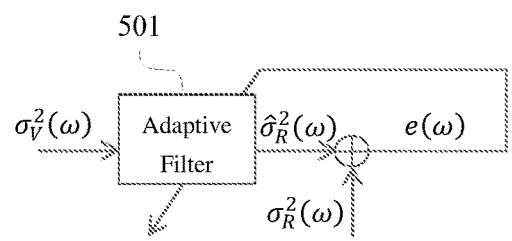
FIG. 5 illustrates an adaptive filtering model in accordance with an example embodiment.

FIG. 5 illustrates an adaptive filtering model in accordance with an example embodiment. The reverberation model may use an FIR filter 501 denoted as $h(\omega)=[h_0\ h_1\ \ldots\ h_{l-1}]^T$, where l represents the filter length as described previously. For example, the filter length may be set as 25 for a 500 ms reverberation process, with each of the frame length equal to 20 ms. The reverberation process longer than 500 ms is normally preferred because a longer reverberation will be identified by different models more easily. By using a conventional normalized least mean squares (NLMS) algorithm as below, the adaptive filtering model may be derived.

$$\hat{\sigma}_r^2(\omega) = h^T(\omega, k-1)Y(\omega, k) \quad (27)$$

$$e(\omega) = \sigma_r^2(\omega) - \hat{\sigma}_r^2(\omega) \quad (28)$$

$$h(\omega, k) = h(\omega, k-1) + \mu \frac{e(\omega)Y(\omega, k)}{\|Y(\omega, k)\|^2} \quad (29)$$

where $\mu$ represents the adaption stepsize set to 0.1. Typically, the value of $\mu$ may range from 0.05 to 0.2. Y represents the filter input taps, i.e., $Y(\omega, k)=[\sigma_d^2(\omega, k)\ \sigma_d^2(\omega, k-1)\ \ldots\ \sigma_d^2(\omega, k-l+1)]^T$. $\hat{\sigma}_r^2(\omega)$ represents the estimated reverberant energy component by the filter 501, and $e(\omega)$ represents an error between $\sigma_r^2(\omega)$ and $\hat{\sigma}_r^2(\omega)$.

By taking reference back to FIG. 1, at the step S102, if the active audio source corresponds to none of the existing sample sources, the adaptive filter 501 may be set to a predefined value or a value for the previous time frame for initiating the approximation of the adaptive filtering model. The expected reverberant energy component $\hat{\sigma}_r^2(\omega)$ generated by the adaptive filter 501 is compared with the reverberant energy component $\sigma_r^2(\omega)$ calculated by Equation (10). By minimizing the error over time, the adaptive filter 501 can be optimized for the particular active audio source, which corresponds to the step S103 of FIG. 1.

On the other hand, if there exists one sample source corresponded to the active audio source, the adaptive filtering model associated with the corresponded sample source can be assigned for obtaining the initial filter 501. As a result, the assigned adaptive filter will rapidly finish the adaption process or omit the adaption process, and the reverberant energy component can be rapidly estimated over time compared with the scenario through the steps S102 and S103.

It should be noted that the direct and reverberant energy components and their corresponding models may be performed for all frequencies bin independently in parallel. The overall reverberation model can be denoted as:

$$R_{model}(\omega)=[h(\omega_L)\ \ldots\ h(\omega_U)] \quad (30)$$

where $\omega_L$ and $\omega_U$ represent the lower and upper bound frequency of interest. In one embodiment, for speech sources, the bounds may be limited to 200 Hz and 8 kHz, respectively in order to save computing resources. In another embodiment, for instrument sources, the bounds may be set to 20 Hz and 20 kHz in order to convey music data without compromising on details.

Figure 6:
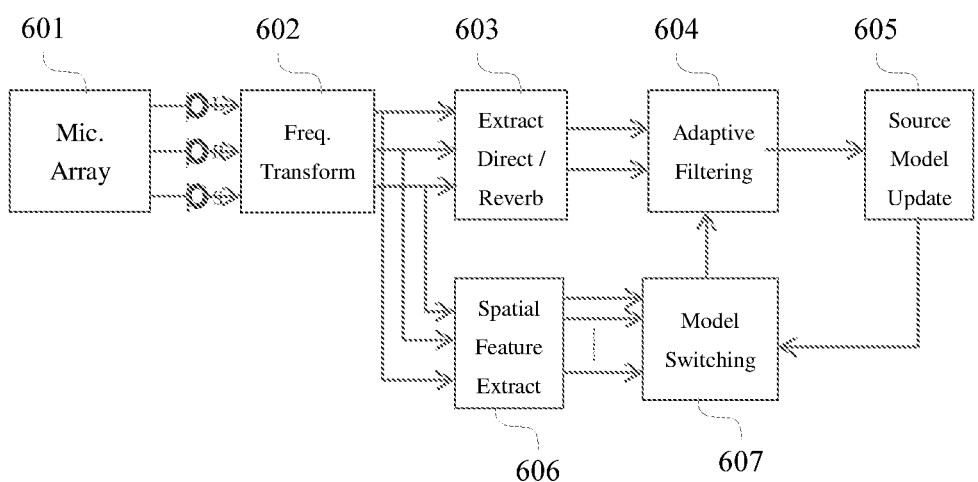
FIG. 6 illustrates an example block diagram for adaptive filtering model updating in accordance with an example embodiment.

An overall flow of the example embodiments above can be seen in FIG. 6. At 601, sound from the active audio source is captured by the microphone array and transformed into a frequency domain at 602. At 606, some of the spatial features may be extracted to examine whether the active audio source corresponds to an existing sample source in a library. If yes, one of the sample sources can be assigned to the active audio source at 607 which is then used for speeding up the reverberation extracting process. On the other hand, at 603, the direct and reverberant energy components can be extracted, for example by Equations (10) and (25) described above. At 604, a proper adaptive filtering model is obtained either from 607 or from 603, and the reverberation estimation is carried out with the obtained adaptive filtering model. The adaptive filtering model can be updated over time at 605 in response to any spatial change of the active audio source, which is then saved in the library by updating one of the existing sample sources.

With the reverberation estimation processes described above, a library including a number of sample sources is used to save the corresponding adaptive filtering model either predefined for all the audio sources in a room, or learned by the algorithms (Equations (10) and (25), for example) and framework (FIG. 5) described above on the fly. As a result, in a teleconference for example, when attenders are discussing, the method disclosed herein is able to rapidly assign an adaptive filtering model associated with one of the sample sources to the speaking attender and its reverberant energy component is easily estimated. This estimation is rapid, precise and robust, making the obtained reverberant energy component as well as the direct energy component credible for later processing such as diffusivity estimation, which is otherwise hard to realize.

Extraction Process for a Single Microphone

The previous embodiments make use of multiple microphones, for example two or more microphones of any geometry, with the assumption that the reverberant energy is more diffuse or higher in dimensionality than the direct energy. Additionally, the reverberant energy is greater than the general diffuse noise (acoustic or electrical noise) at the signal inputs for some period of time after the onset of energy.

In another example embodiment disclosed herein, only one microphone such as an omnidirectional microphone is used to capture sound. The adaptive filtering model is different from the one illustrated by FIG. 5. This approach is well suited to estimating the reverberation response in a given range. More specifically, the reverberation is preferred to be significant compared with the natural decay or autocorrelation of the temporal power spectrum variation of the audio source.

In this embodiment, it is preferred that the energy signal being estimated is strictly positive, and the direct and reverberant signals are uncorrelated. Furthermore, it may be assumed that the clean voice power spectrum is largely impulsive, with rapid onset and a decay rate much greater than that for the reverberation. For example, natural voice characteristics are decaying at least 20 or 30 dB within 100 ms, being around half of the normal syllable duration. This would correspond to a room with the reverberation time being less than 200 ms. In that sense, it may be assumed that the impulse response and reverberation characteristics represent a strictly positive filter that represents a spread or slower decay of the signal energy than the underlying excitation (voice). Otherwise, the reverberation would be of low significance to any perception or signal processing.

Figure 7:
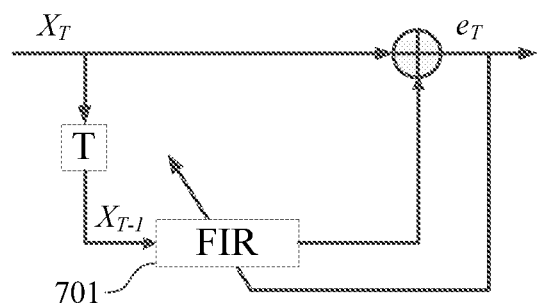
FIG. 7 illustrates an adaptive filtering model in accordance with another example embodiment.

However, it is noted that in this case, the error signal $e_t$ is not zero mean Gaussian, rather it is the impulsive signal shown in FIG. 7 for a clean audio signal. In one embodiment, the assumption of $e_t$ being zero mean (and ideally Gaussian) is required in order to prevent bias in the identified FIR.

As seen in FIG. 7, the adaptive filtering model is estimated by feeding an energy of the captured sound of a previous time frame $X_{t-1}$ into a predefined adaptive filter 701 and lowering a difference between an output of the adaptive filter 701 and an energy of the captured sound of a current time frame $X_t$. The energy of the captured sound of a current time frame $X_t$ can be calculated by:

$$X_t = \sum_{i=1}^{N} h_i X_{i-1} + e_t \quad (31)$$

where $h_i$ represents the filter coefficient for the i-th frame.

The estimation of the reverberant energy component for the previous time frame can be obtained by Equation (32) and error between the current time frame (the active audio source stops making sound) and the estimation can be obtained by Equation (33) as below:

$$\hat{X}_t = \sum_{i=1}^{N} h_i X_{t-i} \quad (32)$$

$$e_t = X_t - \hat{X}_t \quad (33)$$

The filter coefficient can then be calculated by:

$$h_i = h_i + \beta e_t X_{t-i}, \text{ if } X_t < \alpha X_{t-1} \quad (34)$$

where $\alpha$ and $\beta$ are two constants defined in the following.

$\alpha$ may be set such that a maximum reverberation time constant is allowed to be estimated effectively, and the impact of the clean audio energy is reduced from biasing the adaption. An example value is to set $\alpha$ for a maximum reverberation time of around 1 second, in which case for a 20 ms update rate, it can be seen that the value would represent a decay in each frame of at least 1.2 dB, or in the power domain a scalar value of 0.75. A range of values for $\alpha$ at 20 ms would be from around 0.25 (200 ms) to 0.9 (3000 ms). For different block sizes, the value of $\alpha$ can be calculated appropriately. It should be noted that using a smaller value for $\alpha$ decreases the bias on the identified filter coefficients for smaller reverberation times.

$\beta$ may be set by using normal considerations for adaptive filters. Whilst a normalized LMS approach could be considered, it is noted that generally a better estimation of the reverberation decay filter will be obtained when the larger error values $e_t$ dominate the adaption, which occurs with less normalization. Approaches of managing the normalization and transition from normalized to direct LMS are already known and thus the descriptions thereof are omitted.

The ability to estimate the reverberant energy, according to the embodiments disclosed herein, may be achieved without a requirement of specific stage of the separation of an audio signal into components representing the reverberation and direct source. For example, no explicit source separation, beam-forming or deconvolutive processing is required as much as those of the existing approaches.

Figure 8:
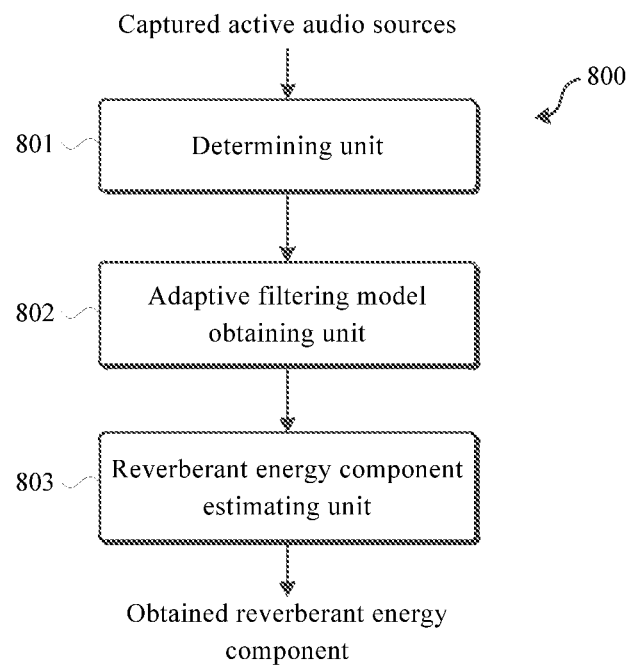
FIG. 8 illustrates a system for estimating reverberant energy component from an active audio source in accordance with an example embodiment.

FIG. 8 illustrates a system 800 for estimating a reverberant energy component from an active audio source in accordance with an example embodiment described herein. As shown, the system 800 includes a determining unit 801 configured to determine a correspondence between the active audio source and a plurality of sample sources, each of the sample sources being associated with an adaptive filtering model, an adaptive filtering model obtaining unit 802 configured to obtain an adaptive filtering model for the active audio source based on the determined correspondence, and a reverberant energy component estimating unit 803 configured to estimate the reverberant energy component from the active audio source over time based on the adaptive filtering model.

In an example embodiment, the adaptive filtering model obtaining unit 802 may comprise a sample source creating unit and an adaptive filtering model estimating unit. In response to determining that the active audio source corresponds to none of the sample sources, the sample source creating unit may be configured to create a sample source corresponding to the active audio source; and the adaptive filtering model estimating unit may be configured to estimate the adaptive filtering model associated with the created sample source. The system also includes an adaptive filtering model assigning unit. In response to determining that the active audio source corresponds to one of the sample sources, the adaptive filtering model assigning unit is configured to assign the adaptive filtering model associated with the corresponding sample source to the active audio source.

In some example embodiments, the system 800 may include a sound capturing unit configured to capture sound from the active audio source by using at least one microphone; and a spatial feature extracting unit configured to extract a spatial feature from the captured sound, wherein the determining unit is configured to determine the correspondence between the active audio source and the plurality of sample sources is based on the extracted spatial feature.

In another example embodiment, the adaptive filtering model estimating unit 803 may include a sound transforming unit configured to transform the captured sound into an audio signal in a frequency domain; and an energy component extracting unit configured to extract a direct energy component and the reverberant energy component, wherein the adaptive filtering model estimating unit is configured to estimate the adaptive filtering model by feeding the direct energy component and the reverberant energy component into a predefined adaptive filter and lowering a difference between an output of the adaptive filter and the reverberant energy component. In a further example embodiment, the energy component extracting unit may be configured to extract the direct energy component and the reverberant energy component based on an arrangement of the microphone and a linear relation of the audio signal between one or two of the microphones. In yet another example embodiment, the at least one microphone comprises three microphones, and the arrangement of the microphone comprises three directional cardioid microphones or three omnidirectional microphones in equilateral triangle topology.

In some other example embodiments, the adaptive filtering model estimating unit 803 may be configured to estimate the adaptive filtering model by feeding an energy of the captured sound of a previous time frame into a predefined adaptive filter and lowering a difference between an output of the adaptive filter and an energy of the captured sound of a current time frame. In another example embodiment, the at least one microphone comprises one omnidirectional microphone for capturing sound from the active audio source.

In yet another example embodiment, the determining unit 801 may include a selecting unit configured to select one of the sample sources spatially closest to the active audio source, wherein the determining unit is configured to determine that the active audio source corresponds to the selected sample source in response to a distance between the selected sample source and the active audio source being within a predefined threshold.

In some other example embodiments, the spatial feature comprises at least one of angle, diffusivity or sound level.

For the sake of clarity, some optional components of the system 800 are not shown in FIG. 8. However, it should be appreciated that the features as described above with reference to FIGS. 1-7 are all applicable to the system 800. Moreover, the components of the system 800 may be a hardware module or a software unit module. For example, in some embodiments, the system 800 may be implemented partially or completely with software and/or firmware, for example, implemented as a computer program product embodied in a computer readable medium. Alternatively or additionally, the system 800 may be implemented partially or completely based on hardware, for example, as an integrated circuit (IC), an application-specific integrated circuit (ASIC), a system on chip (SOC), a field programmable gate array (FPGA), and so forth. The scope of the present invention is not limited in this regard.

Figure 9:
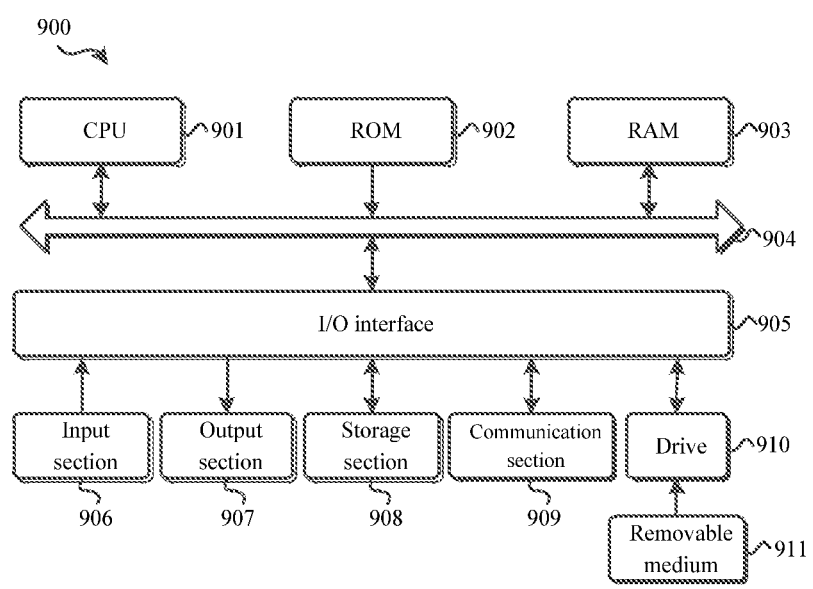
FIG. 9 illustrates a block diagram of an example computer system suitable for the implementing example embodiments disclosed herein.

FIG. 9 shows a block diagram of an example computer system 900 suitable for implementing example embodiments disclosed herein. As shown, the computer system 900 comprises a central processing unit (CPU) 901 which is capable of performing various processes in accordance with a program stored in a read only memory (ROM) 902 or a program loaded from a storage section 908 to a random access memory (RAM) 903. In the RAM 903, data required when the CPU 901 performs the various processes or the like is also stored as required. The CPU 901, the ROM 902 and the RAM 903 are connected to one another via a bus 904. An input/output (I/O) interface 905 is also connected to the bus 904.

The following components are connected to the I/O interface 905: an input section 906 including a keyboard, a mouse, or the like; an output section 907 including a display, such as a cathode ray tube (CRT), a liquid crystal display (LCD), or the like, and a speaker or the like; the storage section 908 including a hard disk or the like; and a communication section 909 including a network interface card such as a LAN card, a modem, or the like. The communication section 909 performs a communication process via the network such as the internet. A drive 910 is also connected to the I/O interface 905 as required. A removable medium 911, such as a magnetic disk, an optical disk, a magneto-optical disk, a semiconductor memory, or the like, is mounted on the drive 910 as required, so that a computer program read therefrom is installed into the storage section 908 as required.

Specifically, in accordance with the example embodiments disclosed herein, the processes described above with reference to FIGS. 1-7 may be implemented as computer software programs. For example, example embodiments disclosed herein comprise a computer program product including a computer program tangibly embodied on a machine readable medium, the computer program including program code for performing methods 100. In such embodiments, the computer program may be downloaded and mounted from the network via the communication section 909, and/or installed from the removable medium 911.

Generally speaking, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments disclosed herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, example embodiments disclosed herein include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present invention may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed among one or more remote computers or servers.

Further, while operations are depicted in a particular order, this should not be understood as requiring that such operations be performed in the particular order shown or in a sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Various modifications, adaptations to the foregoing example embodiments of this invention may become apparent to those skilled in the relevant arts in view of the foregoing description, when read in conjunction with the accompanying drawings. Any and all modifications will still fall within the scope of the non-limiting and example embodiments of this invention. Furthermore, other example embodiments set forth herein will come to mind of one skilled in the art to which these embodiments pertain to having the benefit of the teachings presented in the foregoing descriptions and the drawings.

Various aspects of the present invention may be appreciated from the following enumerated example embodiments (EEEs).

EEE 1. A method of estimating a reverberant energy component from an active audio source, comprising:
determining a correspondence between the active audio source and a plurality of sample sources, each of the sample sources being associated with an adaptive filtering model;
obtaining an adaptive filtering model for the active audio source based on the determined correspondence; and
estimating the reverberant energy component from the active audio source over time based on the adaptive filtering model.

EEE 2. The method according to EEE 1, wherein obtaining an adaptive filtering model for the active audio source comprises:
in response to determining that the active audio source corresponds to none of the sample sources:
creating a sample source corresponding to the active audio source; and
estimating the adaptive filtering model associated with the created sample source;
in response to determining that the active audio source corresponds to one of the sample sources:
assigning the adaptive filtering model associated with the corresponding sample source to the active audio source.

EEE 3. The method according to EEE 2, further comprising:
capturing sound from the active audio source by using at least one microphone; and
extracting a spatial feature from the captured sound,
wherein determining the correspondence between the active audio source and the plurality of sample sources comprises determining the correspondence based on the extracted spatial feature.

EEE 4. The method according to EEE 3, wherein estimating the adaptive filtering model comprises:
transforming the captured sound into an audio signal in a frequency domain;
extracting a direct energy component and the reverberant energy component; and
estimating the adaptive filtering model by:
feeding the direct energy component and the reverberant energy component into a predefined adaptive filter, and
lowering a difference between an output of the adaptive filter and the reverberant energy component.

EEE 5. The method according to EEE 4, wherein the extracting comprises:
extracting the direct energy component and the reverberant energy component based on an arrangement of the microphone and a linear relation of the audio signal between one or two of the microphones.

EEE 6. The method according to EEE 5, wherein the at least one microphone comprises one of the following:
three microphones arranged in directional cardioid topology, or
three omnidirectional microphones arranged in equilateral triangle topology.

EEE 7. The method according to EEE 2, wherein estimating the adaptive filtering model comprises:
estimating the adaptive filtering model by feeding an energy of the captured sound of a previous time frame into a predefined adaptive filter; and
lowering a difference between an output of the adaptive filter and an energy of the captured sound of a current time frame.

EEE 8. The method according to EEE 7, wherein the at least one microphone comprises an omnidirectional microphone for capturing sound from the active audio source.

EEE 9. The method according to any of EEEs 1 to 8, wherein determining the correspondence between the active audio source and the plurality of sample sources comprises:
selecting one of the sample sources spatially closest to the active audio source; and
determining that the active audio source corresponds to the selected sample source in response to a distance between the selected sample source and the active audio source being within a predefined threshold.

EEE 10. The method according to any of EEEs 3 to 8, wherein the spatial feature comprises at least one of angle, diffusivity or sound level.

EEE 11. A system for estimating a reverberant energy component from an active audio source, comprising:
a determining unit configured to determine a correspondence between the active audio source and a plurality of sample sources, each of the sample sources being associated with an adaptive filtering model;

an adaptive filtering model obtaining unit configured to obtain an adaptive filtering model for the active audio source based on the determined correspondence; and a reverberant energy component estimating unit configured to estimate the reverberant energy component from the active audio source over time based on the adaptive filtering model.

EEE 12. The system according to EEE 11, wherein the adaptive filtering model obtaining unit comprises:

a sample source creating unit and an adaptive filtering model estimating unit, wherein in response to determining that the active audio source corresponds to none of the sample sources:

the sample source creating unit is configured to create a sample source corresponding to the active audio source; and the adaptive filtering model estimating unit is configured to estimate the adaptive filtering model associated with the created sample source; and an adaptive filtering model assigning unit, wherein in response to determining that the active audio source corresponds to one of the sample sources:

the adaptive filtering model assigning unit is configured to assign the adaptive filtering model associated with the corresponding sample source to the active audio source.

EEE 13. The system according to EEE 12, further comprising:

a sound capturing unit configured to capture sound from the active audio source by using at least one microphone; and a spatial feature extracting unit configured to extract a spatial feature from the captured sound, wherein the determining unit is configured to determine the correspondence between the active audio source and the plurality of sample sources based on the extracted spatial feature.

EEE 14. The system according to EEE 13, wherein the adaptive filtering model estimating unit comprises:

a sound transforming unit configured to transform the captured sound into an audio signal in a frequency domain; and an energy component extracting unit configured to extract a direct energy component and the reverberant energy component, wherein the adaptive filtering model estimating unit is configured to estimate the adaptive filtering model by feeding the direct energy component and the reverberant energy component into a predefined adaptive filter and lowering a difference between an output of the adaptive filter and the reverberant energy component.

EEE 15. The system according to EEE 14, wherein the energy component extracting unit is configured to extract the direct energy component and the reverberant energy component based on an arrangement of the microphone and a linear relation of the audio signal between one or two of the microphones.

EEE 16. The system according to EEE 15, wherein the at least one microphone comprises one of the following:

three microphones arranged in directional cardioid topology, or three omnidirectional microphones arranged in equilateral triangle topology.

EEE 17. The system according to EEE 12, wherein the adaptive filtering model estimating unit is configured to estimate the adaptive filtering model by feeding an energy of the captured sound of a previous time frame into a predefined adaptive filter and lowering a difference between an output of the adaptive filter and an energy of the captured sound of a current time frame.

EEE 18. The system according to EEE 17, wherein the at least one microphone comprises an omnidirectional microphone for capturing sound from the active audio source.

EEE 19. The system according to any of EEEs 11 to 18, wherein the determining unit comprises:

a selecting unit configured to select one of the sample sources spatially closest to the active audio source, wherein the determining unit is configured to determine that the active audio source corresponds to the selected sample source in response to a distance between the selected sample source and the active audio source being within a predefined threshold.

EEE 20. The system according to any of EEEs 13 to 18, wherein the spatial feature comprises at least one of angle, diffusivity or sound level.

EEE 21. A computer program product for estimating a reverberant energy component from an active audio source, the computer program product being tangibly stored on a non-transient computer-readable medium and comprising machine executable instructions which, when executed, cause the machine to perform steps of the method according to any of EEEs 1 to 10.

The invention claimed is:

1. A method of estimating a reverberant energy component from an active audio source, comprising:

determining a plurality of spatial features of the active audio source based on captured sound from the active audio source, wherein the plurality of spatial features comprise diffusivity;

determining a correspondence between the active audio source and a plurality of adaptive filtering models, each adaptive filtering model corresponding to a respective plurality of spatial features, by comparing the plurality of spatial features of the active audio source with the plurality of spatial features of the plurality of adaptive filtering models, wherein determining the correspondence comprises determining, for each of the plurality of adaptive filtering models, a respective distance between the plurality of spatial features of the active audio source and the respective plurality of spatial features of the each adaptive filtering model;

obtaining a particular adaptive filtering model for the active audio source based on each of the determined distances; and estimating the reverberant energy component from the active audio source over time based on the particular adaptive filtering model.

2. The method according to claim 1, wherein obtaining the particular adaptive filtering model for the active audio source comprises:

in response to determining that none of the determined distances satisfies a predefined threshold:

creating the particular adaptive filtering model, including assigning the spatial features of the active audio source to the particular adaptive filtering model; or in response to determining that a determined distance that corresponds to one of the adaptive filtering model satisfied the predetermined threshold:

assigning the one adaptive filtering model of the plurality of adaptive filtering models to the active audio source; and designating the one adaptive filtering model as the particular adaptive filtering model.

3. The method according to claim 2, wherein creating the particular adaptive filtering model comprises:

estimating the particular adaptive filtering model by feeding an energy of the captured sound of a previous time frame into a predefined adaptive filter; and lowering a difference between an output of the adaptive filter and an energy of the captured sound of a current time frame.

4. The method according to claim 3, wherein the sound from the active audio source is captured by at least one audio capturing device, the at least one audio capturing device comprising an omnidirectional microphone.

5. The method according to claim 1, wherein the active audio source comprise speakers of an audio conference located at different positions with regards to at least one audio capturing device.

6. The method according to claim 1, wherein obtaining the adaptive filtering model comprises:

transforming the captured sound into an audio signal in a frequency domain;

extracting a direct energy component and the reverberant energy component; and estimating the particular adaptive filtering model by:
feeding the direct energy component and the reverberant energy component into a predefined adaptive filter, and lowering a difference between an output of the predefined adaptive filter and the reverberant energy component.

7. The method according to claim 6, wherein the sound from the active audio source is captured by at least one audio capturing device by performing operations comprising:

extracting the direct energy component and the reverberant energy component based on an arrangement of the at least one audio capturing device and a linear relation of the audio signal between one or two audio capturing devices.

8. The method according to claim 1, wherein the sound from the active audio source is captured by at least one audio capturing device and wherein the at least one audio capturing device comprises at least one of:

three microphones arranged in directional cardioid topology, or three omnidirectional microphones arranged in equilateral triangle topology.

9. The method according to claim 1, wherein the plurality of spatial features of the audio source comprise spatial information about the audio source, and wherein determining the correspondence between the active audio source and the plurality of adaptive filtering models comprises:

selecting one of the plurality of adaptive filtering models the spatial features of which are closest to the active audio source; and determining that the active audio source corresponds to the selected adaptive filtering model in response to determining that a distance between spatial features of the selected adaptive filtering model and the spatial features of the active audio source is within a predefined threshold.

10. The method according to claim 1, wherein the plurality of spatial features comprises angle, distance, position or sound level.

11. The method according to claim 1, wherein
a spatial feature of an audio source describes a property of the audio source in relation to an audio capturing device which is configured to capture sound from the audio source.

12. The method according to claim 1, wherein determining the correspondence between the active audio source and the plurality of adaptive filtering models comprises determining an adaptive filtering model of the plurality of adaptive filtering models whose spatial features are closest to the spatial features of the active audio source.

13. A computer program product for estimating a reverberant energy component from an active audio source, the computer program product being tangibly stored on a non-transient computer-readable medium and comprising machine executable instructions which, when executed, cause one or more processors to perform steps of the method according to claim 1.

14. The method according to claim 1, wherein
a spatial feature of an audio source is indicative of at least one of: a position of the audio source relative to the audio capturing device, spatial information regarding the audio source relative to the audio capturing device, a distance of the audio source from the audio capturing device, an angle indicating an orientation of the audio source relative to the audio capturing device, a sound level at which sound coming from the audio source is captured at the audio capturing device and/or a diffusivity of sound being emitted by the audio source.

15. The method according to claim 1, wherein
a spatial feature of the active audio source is determined based on data of the active audio source captured by one or more sensors including at least one of an audio capturing device, a visual capturing device and/or an infrared detection device.

16. A system for estimating a reverberant energy component from an active audio source, comprising:
a determining unit configured to:
determine a plurality of spatial features of the active audio source based on captured sound from the active audio source, wherein the plurality of spatial features comprise diffusivity; and determine a correspondence between the active audio source and a plurality of adaptive filtering models, each adaptive filtering model corresponding to a respective plurality of spatial features, by comparing the plurality of spatial features of the active audio source with the plurality of spatial features of the plurality of adaptive filtering models, wherein determining the correspondence comprises determining, for each of the plurality of adaptive filtering models, a respective distance between the plurality of spatial features of the active audio source and the respective plurality of spatial features of the each adaptive filtering model;

an adaptive filtering model obtaining unit configured to obtain a particular adaptive filtering model for the active audio source based on each of the determined distances; and a reverberant energy component estimating unit configured to estimate the reverberant energy component from the active audio source over time based on the particular adaptive filtering model.

* * * * *